United States Patent
Shao et al.

(10) Patent No.: US 12,314,041 B2
(45) Date of Patent: May 27, 2025

(54) INDUSTRIAL INTERNET OF THINGS OF INDEPENDENT SERVICE PLATFORMS AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 552 days.

(21) Appl. No.: 17/811,885

(22) Filed: Jul. 12, 2022

(65) Prior Publication Data
US 2024/0028008 A1    Jan. 25, 2024

(51) Int. Cl.
*G05B 19/418* (2006.01)
(52) U.S. Cl.
CPC ... *G05B 19/4185* (2013.01); *G05B 19/41835* (2013.01); *G05B 19/418* (2013.01); *G05B 2219/24015* (2013.01); *Y02P 90/02* (2015.11)
(58) Field of Classification Search
USPC .......................................... 702/81
See application file for complete search history.

(56) References Cited

U.S. PATENT DOCUMENTS

2006/0259604 A1* 11/2006 Kotchavi ............ H04L 41/0806
709/223
2017/0242935 A1* 8/2017 Wragg ............... G05B 19/0423
(Continued)

FOREIGN PATENT DOCUMENTS

| CN | 109709915 B | 9/2020 |
| WO | 2019010728 A1 | 1/2019 |

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Paul D Lee
(74) *Attorney, Agent, or Firm* — METIS IP LLC

(57) ABSTRACT

The present disclosure provides an Industrial Internet of Things of an independent service platform and a control method. The method is applied to a user platform, a service platform, a management platform, a sensor network platform and an object platform that interact in sequence. The method includes receiving a monitoring value from at least one timer through the sensor network platform; according to the data source of the monitoring value, distributing the monitoring value to the corresponding service sub-platform of the service platform, which is configured to use different service sub-platforms for storage, data processing and/or data transmission for different types of data, different service sub-platforms corresponding to independent databases, processors, and information channels; and sending the data processing results to the user platform for displaying to a user based on the corresponding information channels in the service platform.

20 Claims, 6 Drawing Sheets

(56) References Cited

U.S. PATENT DOCUMENTS

| | | | |
|---|---|---|---|
| 2018/0191867 A1* | 7/2018 | Siebel | G06F 8/77 |
| 2019/0095817 A1* | 3/2019 | Ma | H04L 67/10 |
| 2019/0243346 A1* | 8/2019 | Baseman | G05B 19/4188 |
| 2023/0186201 A1* | 6/2023 | Cella | G05B 19/4183 |
| | | | 705/7.17 |

OTHER PUBLICATIONS

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

\* cited by examiner

600

610

After generating the production line equipment work schedule, by interacting with the service platform, comparing the generated production line equipment work schedule with the preset production line equipment work schedule according to the index data

620

According to the comparison result decision logic, determining whether to execute the production line equipment work schedule

FIG. 6

INDUSTRIAL INTERNET OF THINGS OF INDEPENDENT SERVICE PLATFORMS AND CONTROL METHODS THEREOF

TECHNICAL FIELD

This present disclosure relates to the field of intelligent manufacturing, in particular to an Industrial Internet of Things of independent service platforms and its control methods.

BACKGROUND

In the field of product intelligent manufacturing, the intelligent product production line involves multiple intelligent manufacturing equipment, which are arranged in sequence according to the upstream and downstream relationships, and the parts, components, or products that need to be manufactured are assembled in sequence to form a product. In the prior art, since the upstream and downstream intelligent manufacturing equipment needs to comprehensively consider the unit product manufacturing volume of each intelligent manufacturing equipment, for example, when the mass production time per time of the upstream equipment is five, the production volume of the downstream equipment per unit time is preferably greater than or equal to five units, so as to avoid the accumulation of the workpieces manufactured by the upstream equipment and the downstream equipment that cannot be digested in time. If the production volume of downstream equipment per time is less than five, it will cause the upstream equipment to suspend operations (generally, it will not be shut down because some equipment consumes high energy and takes a long time to restart and needs to be preheated, pre-regulated, etc., resulting in high cost and long working hours), and the downstream equipment can only work again after the accumulated workpieces are produced, which leads to the upstream equipment consuming a lot of no-load time and even the accumulation of intermediate products, resulting in the overall paralysis of the production line. However, when the upstream equipment stops operating, the upstream and upstream equipment must also be adjusted accordingly, resulting in product adjustments in the entire production line, when affects the progress and orderly coordination of the entire process.

In practical applications, it is generally necessary to adjust the output in real time according to the production plan. Taking the production line increase operation as an example, when the production line output cannot meet the production plan, it is generally solved by increasing the output of each link. Therefore, unlike the traditional on-demand distribution production, because intelligent manufacturing needs to solve the role that human resources need to play in the entire production, the confirmation and adjustment of the maximum production capacity of the production line is a very critical parameter and production line optimization method in intelligent manufacturing.

Therefore, it is necessary to provide an Industrial Internet of Things of an independent service platform and its control method. Through reasonable module function layout and control method optimization, it is convenient for the overall debugging of the production line to maximize the output of the production line.

SUMMARY

One or more embodiments of this present disclosure provide an Industrial Internet of Things of an independent service platform, including: a user platform, a service platform, a management platform, a sensor network platform, and an object platform that interact in sequence. The object platform includes a data collector that monitors operating parameters of a production line equipment performing manufacturing, the data collector includes at least one timer, the at least one timer is configured to obtain monitoring values of a process node, a process stage, or a process production line set in the production process to complete set function, a corresponding relationship is between the at least one timer and the database of the service platform in data transmission, the corresponding relationship refers to that a single database receives a single type of data, and the data in the single database is processed by an independent processor and transmitted by an independent information channel. The management platform is configured to receive the monitoring values from the at least one timer through the sensor network platform, and according to data source of the monitoring values, the monitoring values are distributed to corresponding service sub-platforms of the service platform. The service platform is configured to use different service sub-platforms for storage, data processing and/or data transmission of different types of data, the different service sub-platforms correspond to independent databases, processors, and information channels, and send data processing result in the service platform to the user platform via a corresponding information channel for displaying to a user.

One or more embodiments of this present disclosure provide a control method for an Industrial Internet of Things of an independent service platform. The method is applied to a user platform, a service platform, a management platform, a sensor network platform, and an object platform that interact in sequence. The object platform includes a data collector that monitors operating parameters of a production line equipment performing manufacturing, the data collector includes at least one timer, the at least one timer is configured to obtain monitoring values of a process node, a process stage, or a process production line set in the production process to complete set function, a corresponding relationship is between the at least one timer and the database of the service platform in data transmission, the corresponding relationship refers to that a single database receives a single type of data, and the data in the single database is processed by an independent processor and transmitted by an independent information channel. The method includes: receiving the monitoring values from the at least one timer through the sensor network platform, and according to data source of the monitoring values, distributing the monitoring values to corresponding service sub-platforms of the service platform, using different service sub-platforms for storage, data processing, and/or data transmission of different types of data, and the different service sub-platforms corresponding to independent databases, processors, and information channels, and sending data processing result in the service platform to the user platform via a corresponding information channel for displaying to a user.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same number denote the same structure, wherein:

FIG. 6 is an exemplary flowchart illustrating a process for determining whether to execute an operation schedule of the production line equipment according to some embodiments of the present disclosure.

DETAILED DESCRIPTION

Figure 1:
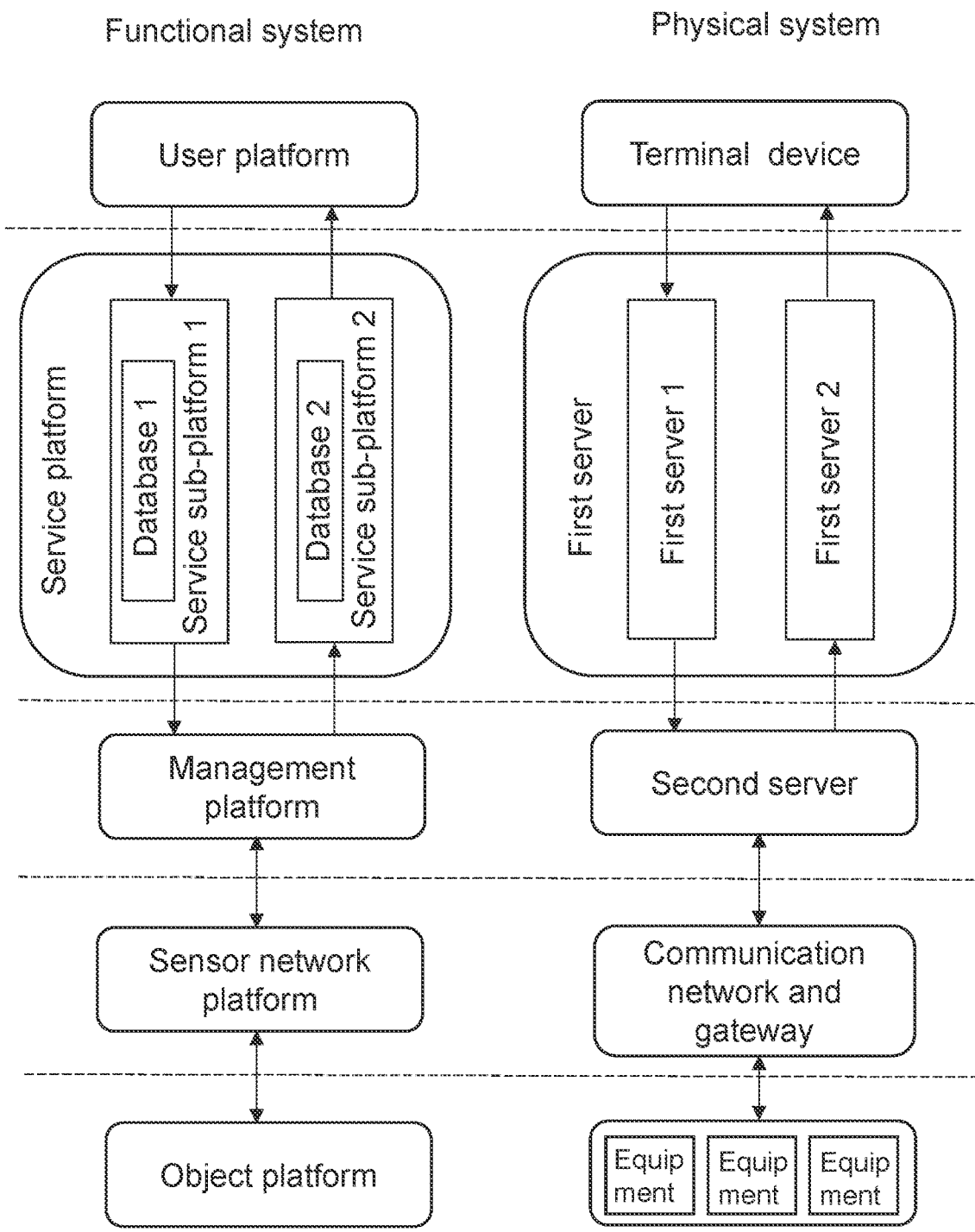
FIG. 1 is a schematic diagram illustrating an application scenario of an Industrial Internet of Things of an independent service platform according to some embodiments of this present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this present disclosure, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an application scenario of an Industrial Internet of Things of an independent service platform according to some embodiments of this present disclosure. As shown in FIG. 1, an Industrial Internet of Things of an independent service platform includes: a user platform, a service platform, a management platform, a sensor network platform, and an object platform that interact in sequence.

The user platform may be a platform for interacting with a user. In some embodiments, the user platform may be configured as a terminal device, and the terminal device may include a personal computer, a tablet computer, an ipad, a mobile phone or other electronic devices capable of data processing, data communication, and human-computer interaction. In some embodiments, the user platform may receive user input requests and/or instructions (e.g., user input data requests, control parameter calling instructions, etc.). In some embodiments, the user platform may interact with the service platform and send requests and/or instructions input to the service platform, and the service platform performs corresponding processing in response to the requests and/or instructions. For example, the user platform may send a data request, a control parameter calling request, or the like input by a user to the service platform. In some embodiments, the user platform may send a control parameter calling instruction to the service platform, and the service platform receives the control parameter calling instruction and delivers a control parameter group under the control parameter calling instruction to the management platform. At the same time, through the interaction between the user platform and the service platform, the control parameter modification, the control parameter group deletion, and the control parameter group addition may be performed on the control parameter groups in the service platform.

In some embodiments, the user platform may also display a received data to the user. Exemplarily, after the user platform obtains a result data package generated through the service platform performing data processing, the result data package is parsed for displaying to the user in the form of screen numerical display and a generated curve or table associated with the numerical value through the human-computer interaction method on the user platform.

The service platform may be a platform for receiving and transmitting data and/or information. In some embodiments, the service platform adopts an independent arrangement, and the independent arrangement refers to that the platform uses different databases to store different types of data, use different processors for data processing, and/or use different information channels for data transmission. In some embodiments, the service platform may include at least one sub-platform. For example, as shown in FIG. 1, the service platform may include a service sub-platform 1 and a service sub-platform 2, the service sub-platform 1 corresponds to a database 1, and the service sub-platform 2 corresponds to a database 2. The same type of data may be stored, processed, and transmitted in the database on the same sub-platform. Different types of data may be stored, processed and transmitted in the database on different sub-platforms.

In some embodiments, the service platform may be configured as a first server for extracting and processing data required by the user platform from the management platform and sending a data processing result to the user platform. For example, according to preset rules or the data request of the user platform, the service platform may calculate a relevant data of monitoring values contained in a set time period and send the relevant data of the monitoring values to the user platform through an information channel. In some embodiments, according to the definition of service platform independence in the present disclosure, the service platform may include multiple independent first servers, and each sub-platform may correspond to an independent first server. For example, the service sub-platform 1 may be configured as an independent first server 1, and the service sub-platform 2 may be configured as an independent first server 2. Each of first servers has a data storage function, a computing function, and a communication function that satisfies interaction.

In some embodiments, the service platform may interact directly with the user platform. For example, the service platform may send a data processed by the service platform to the user platform through the information channel. For example, the service platform may receive a data request from the user platform and send a query return instruction to the object platform according to the data request sent by the user platform. As another example, the service platform may receive a control parameter calling instruction sent by the user platform and deliver a control parameter group in the control parameter calling instruction to the management platform.

In some embodiments, the service platform may interact directly with the management platform. For example, the service platform may send a data processed by the service platform to the management platform through the information channel. As another example, the management platform may call the control parameter group configured in the service platform through a control program configured therein to drive the production line equipment to work.

The management platform may coordinate the connection and collaboration between various functional platforms, it gathers all the information of the Industrial Internet of Things 100 of the independent service platform and provides a platform with perception management and control management functions for the Industrial Internet of Things 100 of the independent service platform operating system. In some embodiments, the management platform may be configured as a second server for controlling the operation of the object platform, and a feedback data of the object platform, and acting on the control of the object platform through the feedback data. In some embodiments, the management platform is configured with a control program that drives the production line equipment to work, and the management platform may call any control parameter group in the service platform through the control program to drive the production line equipment to work. In some embodiments, the management platform may also be configured to receive monitoring values from a timer configured in the object platform through the sensor network platform, and according to a data source of the monitoring values, the monitoring values are distributed to a designated database on the service platform for storage, a designated processor is used for data processing, and a designated information channel is used for data transmission.

The sensor network platform may be a platform for processing, storing, and transmitting data and/or information. In some embodiments, the sensor network platform may be configured as a communication network and a gateway for the object platform and the management platform to interact. For example, the management platform may interact with the object platform through the sensor network platform. In some embodiments, when the management platform interacts with the object platform, the sensor network platform may uniformly send monitoring values from timers in the object platform to the management platform.

The object platform may be a functional platform for obtaining data and/or information related to an object. The object may be a production line equipment. In some embodiments, the object platform may be configured as a production line equipment to perform manufacturing and a production line sensor to obtain data of a production line. The production line equipment refers to an equipment used to produce manufactured products, such as assembly machines and other equipment. In some embodiments, the production line equipment includes an actuator, and the actuator may perform corresponding actions under the control of the management platform. For example, the management platform may control the actuator in the object platform according to parameters specifically set in a control parameter group, so as to make the production line equipment work.

In some embodiments, the object platform may be configured to include a data collector that monitors operating parameters of production line equipment performing manufacturing. The data collector refers to an instrument used to collect detection data (e.g., real-time output data of products, operation data of production line equipment) on the production line. In some embodiments, the data collector may include equipment such as photoelectric sensors, Hall sensors, cameras, or the like. In some embodiments, the data collector is configured to include a plurality of timers, each timer is used to obtain monitoring values of process nodes, process stages, or process production lines set in the production process to complete set function. In the data collector, each timer establishes a corresponding relationship with a database in the service platform in terms of data transmission. The corresponding relationship refers to: the type is divided according to the source of monitoring values, a monitoring value of a single or more than one timer is regarded as a same type of data, and a single database receives a single type of data, data in a single database is processed by an independent processor and transmitted by an independent information channel.

In some embodiments, the object platform is configured to automatically store monitoring values obtained by a timer in a database of the object platform, in some embodiments, the object platform is configured to automatically send monitoring values obtained by a timer to the service platform. In some embodiments, the object platform may send historical monitoring values stored in the object platform database to the service platform in response to a query return instruction sent by the service platform.

In particular, at the industrial Internet of Things manufacturing background, the number of process nodes, process stages, or process production lines that constitute a complete production line equipment is large, and there is a problem of synergy between them, therefore a technical solution designed with an independent service platform is proposed.

Specifically, under the industrial Internet of Things manufacturing system, those skilled in the art may complete the entire processing process according to the route of part processing, part detection, module assembly, module detection, product assembly, and product detection. The above parts processing, parts detection, module assembly, module detection, product assembly, and product detection may be defined as a process in the entire processing process. When all the processes meet the set requirements, the products that need to be prepared may be obtained smoothly.

Taking intelligent manufacturing of a membrane gas meter in a smart gas meter as an example, the membrane gas meter may be divided into a meter case and a meter core according to the functions of the components. Functional modules in the meter core include metering components, gas circuit components, gas circuit control components (electromechanical valve components), communication components, etc. In the context of industrial Internet of Things execution manufacturing, it is necessary to calculate the production capacity of process nodes, process stages or process production lines corresponding to each component of the functional module, Set a timing relationship of the process nodes, process stages or process production lines corresponding to each component of the functional module; Set a processing method or response method of the system after the failure of the process nodes, process stages, or process production lines corresponding to each component of the functional module. Taking the assembly of metering components as an example, diaphragm is an important part of metering components. When source of diaphragms materials is set as laminated diaphragm layer, lamination method of diaphragms, recognition accuracy of diaphragms position, and state of a diaphragm when it is picked up by a single diaphragm will all affect installation of diaphragms on diaphragm box, the factors that affect the installation of diaphragms on the diaphragm box proposed above cannot be absolutely excluded or cannot obtain absolute influencing values. Taking gas circuit control components as an example, the parts that make up the gas circuit control assembly generally include a frame, a reduction gear set arranged on the frame, a drive motor and a motion state conversion device. The motion state conversion device converts the rotation output of the reduction gear into linear reciprocating motion for driving the movement of a valve core, multiple gear shafts and multiple transmission gears installed on the gear shafts are arranged in the reduction gear set, which is different from the assembly of a reducer on a transmission power machinery. The above gear shafts and gears have the characteristics of light weight and small volume, which results in there are unstable factors in the acquisition of gear shafts and gears, the installation of gear shafts on the frame (electromechanical valve housing), the installation of gears on gear shafts, and the connection between gears. Specifically, a gear shaft with a specific attitude cannot be accurately obtained, the position of the gears on the gear shafts are deviated, and the gears may not be effectively meshed. During the above components transfer process, the components may not be transferred to next process node, process stage, or process production line within a specified time due to component status, location factors, etc.; it may not to deliver exactly a set number of components to next process node, process stage, or process production line within a specified time period.

In view of the above problems, this solution proposes a technical solution using an independent service platform on the industrial Internet of Things system architecture. In the specific technical solution, in the classification of types of monitoring values, the types are divided according to source of the monitoring values, and the monitoring values of a single or more than one timer are regarded as a same type of data. In the management platform's processing of monitoring values, the management platform is configured to receive monitoring values from the timer through the sensor network platform, and according to data source of the monitoring values, it is distributed to a designated database on the service platform for storage, a designated processor is used for data processing, and a designated information channel is used for data transmission; In the data processing of the received monitoring values by the service platform, the monitoring values of one or more timers are treated as a same type of data, a single database receives a single type of data, and data in a single database is processed by an independent processor and transmitted by an independent information channel. In this way, after a timer obtains the monitoring values, it is uploaded to the management platform through the sensor network platform, according to the data source calibration in the monitoring values, the management platform attributes the monitoring values of the same source or more than one timer set to the same type, and send the same type of data to the service platform for database storage, processing and transmission on the same service sub-platform. Different types of data are stored, processed, and transmitted on different service platform sub-platforms. In this way, during actual operation of the Industrial Internet of Things, the data that are attributed to the same type of the monitoring values may be collected and counted on the same service sub-platform.

Figure 2:
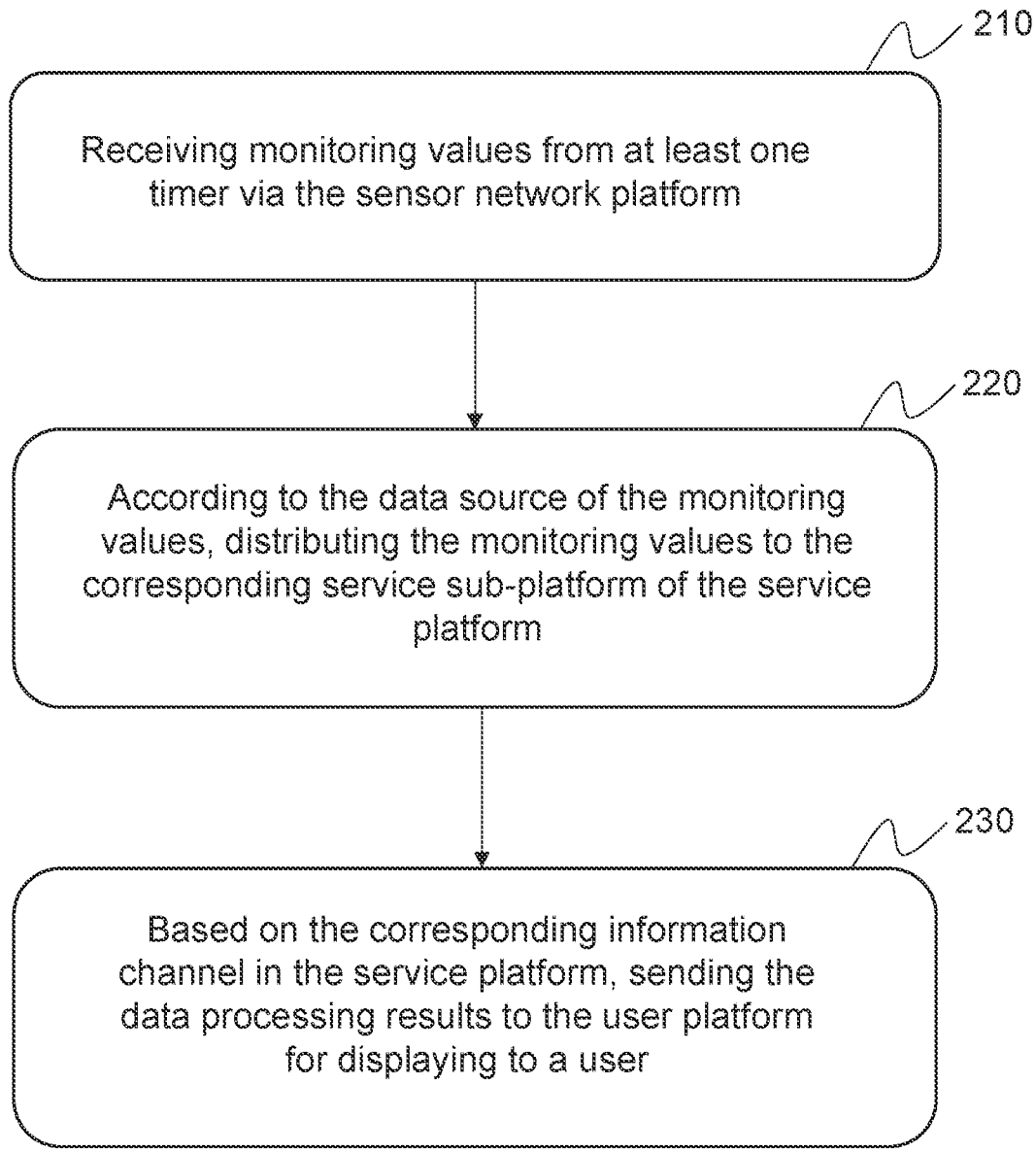
FIG. 2 is an exemplary flowchart illustrating a control method for an industrial Internet of Things of an independent service platform according to some embodiments of the present disclosure.

FIG. 2 is an exemplary flowchart illustrating a control method for the Industrial Internet of Things of an independent service platform according to some embodiments of the present disclosure. In some embodiments, a process 200 may be performed by the management platform. As shown in FIG. 2, the process 200 includes the following steps.

Step 210: receiving monitoring values from at least one timer through the sensor network platform.

The timer may be an equipment or unit configured in the subject platform for measuring the length of time. For example, the timer may include a mechanical clock, an electronic millisecond meter, or the like. In some embodiments, a plurality of timers may be configured in the object platform for obtaining process nodes, process stages, or process production lines set in the production process to complete the monitoring values set by the corresponding process. The monitoring value refers to the time consumption length detected by the timer, such as, 30 minutes, 2 hours, etc.

In some embodiments, there is a corresponding relationship between at least one timer and a database in the service platform in terms of data transmission. The corresponding relationship means that a single database receives a single type of data, and the data in the single database is processed by an independent processor and transmitted by an independent information channel. In some embodiments, the types of data may be divided according to the source of the monitoring values, and the monitoring values of one or more timers from the same source may be regarded as a single type of data. For more information on data sources, please refer to step 220 and its related descriptions.

The process node refers to the node corresponding to the completion of one of the links in the production line. For example, completing any processing link, part assembly link, and detection link may be a process node, the production of any part of the finished product (such as diaphragm, reduction gear set, etc.) may be a process node, completing any part (e.g., diaphragm) detection, module (e.g., metering component) detection, or product (e.g., smart gas meter) detection may be a process node. The process stage refers to the stage corresponding to the completion of multiple consecutive links in the production line. For example, completing the assembly of any module (e.g., metering components, gas circuit components, gas circuit control components) may be a process stage. The process production line refers to the stage corresponding to a certain production line in the production process. For example, the assembly of any functional part (e.g., meter case, meter core) may be a process production line. For example, taking manufacturing of a membrane gas meter as an example, the process production line may include a meter case production line, a meter core production line, etc.

In some embodiments, in the set process flowchart, each step may be set as a process node, a plurality of consecutive steps are set as a process stage; continuous multiple process stages are set as a process production line. In some embodiments, since the application of the industrial Internet of Things system in intelligent manufacturing needs to detect various processing links, assembly links, and detection links on the production line. Therefore, the process nodes, process stages, or process production lines may be set as required.

The corresponding process settings may refer to corresponding operations performed in various stages of the production line. In some embodiments, the process settings corresponding to the process nodes may be part manufacturing, part grinding, part assembly, part debugging, part detecting, etc., the process settings corresponding to the process stages may be module assembly, module debugging and module detecting, etc., the process settings corresponding to the process production lines may be functional component assembly, functional component debugging, and functional component detecting. Exemplarily, taking manufacturing of a membrane gas meter as an example, in the process of parts processing, the process settings corresponding to the process nodes may include manufacturing and grinding parts such as diaphragms and diaphragm boxes, and assembling, debugging, and detection parts such as diaphragms and diaphragm boxes.

In some embodiments, each of the at least one timer may be used to obtain the the production nodes, the process stages, or the process production lines in the production process to complete the monitoring values of the set function. For example, in the process node of diaphragm detection, the timer may detect that the monitoring value of the process setting corresponding to the process node is 10 minutes. As another example, in the process stage of detecting the assembly of the metering component, the timer may detect that the monitoring value of the process setting corresponding to the completion of the process stage is 2 hours. As another example, in the process production line of the meter core, the timer may detect that the monitoring value of the process setting corresponding to the completion of the process production line is 5 hours.

In some embodiments, the object platform may be configured to automatically store monitoring values obtained by the timer in a database of the object platform. In some embodiments, the management platform may interact with the object platform through the sensor network platform and receive the monitoring value form the timer. The sensor network platform uniformly sends the monitoring value from the timer to the management platform through its communication network (e.g., star network, bus network, etc.) and gateways (e.g., the central gateway device of the star network, the sub-node gateway device of the bus network, etc.).

Step 220, according to the data source of the monitoring values, distributing the monitoring values to the corresponding service sub-platform of the service platform.

The data source may be determined according to the timer corresponding to the monitoring values. In some embodiments, the monitoring values originating from the same timer may be attributed to the same type. For example, multiple monitoring values from a timer A may be grouped into the same type. In some embodiments, multiple timers may be used to monitor the same process setting corresponding to a process node, process stage, or process production line, correspondingly, the monitoring values obtained by multiple timers monitoring the same process setting may also be attributed to the same type. For example, monitoring values obtained by multiple timers monitoring part machining may be attributed to the same type.

In some embodiments, the management platform may determine the type of each monitoring value according to the data source of the monitoring value and send the monitoring value of the same type to the service sub-platform corresponding to the service platform. In some embodiments, in the data processing of the received monitoring values by the service platform, the same type of data is determined based on the data source of the monitoring values, a single database receives a single type of data, and data in a single database is processed by an independent processor and transmitted by an independent information channel.

In some embodiments, the service platform may use different service sub-platforms for storage, data processing, and/or data transmission for different types of data, different service sub-platforms correspond to independent databases, processors, and information channels. Correspondingly, different types of data may be stored, processed, and transmitted in the database on different service sub-platforms. As an example only, the specified service sub-platform whose data source is the monitoring value of timer A is M, the specified service sub-platform whose data source is the monitoring value of timer B is N, when the data source of the monitoring values T1 and T2 is the timer A and the data source of the monitoring value T3 is the timer B, it may be determined that the monitoring values T1 and T2 and the monitoring value T3 are monitoring values of different types. The monitoring values T1 and T2 may be stored by the service sub-platform M, the data processing is performed by the processor of the service sub-platform M, and the data transmission is performed by the information channel of the service sub-platform M. The monitoring value T3 may be stored by using the service sub-platform N, the processor of the service sub-platform N performs data processing, and the information channel of the service sub-platform N performs data transmission.

In some embodiments of this present disclosure, during the actual operation of the Industrial Internet of Things, by dividing the monitoring values into types, the data attributed to the same type of the monitoring values may be collected and counted on the same service sub-platform, so that the service platform may uniformly send the data processed by the service platform to the management platform and the management platform or the user Platform through their respective information channels.

In this way, for a certain type of data, its storage, processing, and transmission on the service platform may be independent of other types of data. In the case of uncontrollable time consumption process nodes, process stages, or process production lines to complete the set functions caused by the above-mentioned unstable factors, in the construction and optimization of the Industrial Internet of Things, according to the performance parameters or working characteristics of the actual object platform, a separate service sub-platform may be built or dismantled for a certain type of data to be detected to solve the problem of matching requirements for the data storage capacity, data processing capacity, and data transmission capacity of the service platform for business control tracking. In order to optimize the Industrial Internet of Things, when the Industrial Internet of Things itself or personnel determines that a certain type of monitoring value needs to be added, the problem may be solved by adding a collector and a service sub-platform.

When the Industrial Internet of Things itself or personnel determine that an existing type of monitoring value is an excess monitoring value, the collector that collects the monitoring data and the service sub-platform that stores, calculates, and transmits the monitoring value may be used for monitoring, removal, or replacement to optimize the use of the object platform and the use of the service platform. The above service platform and object platform settings are convenient to complete the overall debugging and overall optimization of the production line. The above content is actually the application of distributed data processing in the industrial Internet of Things system, the specific service sub-platform may achieve the purpose of data processing by using relatively cheap personal computers such as personal computers. In this way, it not only solves the problems of slow response speed and difficult system construction caused by centralized data processing, but also optimizes the construction cost of the Industrial Internet of Things.

In the normalized data processing of monitoring values, since the unified type of monitoring values may be processed separately according to the actual demand, under the condition that the service platform meets the performance index and does not have excessive performance, and the specific type may be supplemented according to the production needs and the actual situation in the production process. Therefore, in the coupling relationship between different sub-platforms of the object platform, it is easy to realize: according to the processing results of different service sub-platforms, the different sub-platforms of the object platform have the best connection method, for example, along the production process of the product, through the processing results of each service sub-platform, reasonably handling the relationship between the actions of the upper-level object platform sub-platform and the lower-level object platform sub-platform in terms of time sequence, and finally obtain the maximum production line capacity output.

In some embodiments, when using the corresponding service sub-platform in the service platform to perform data processing according to the data source of the monitoring values, the processor may calculate the relevant data of the monitoring values contained in the set time period according to the preset rules or the data request of the user platform, so as to perform data processing.

The preset rule refers to the rule related to data processing set in advance. This preset rule may be used to specify how the data (e.g. monitoring values) should be processed (e.g., calculation). Just as an example, the preset rule may be to obtain a maximum value, a minimum value, or an average value, etc., which is not limited in this present disclosure.

The data request of the user platform may be a request for obtaining relevant data input by the user through the user platform. For example, the data request may be to obtain the monitoring values of the data source for part detection (e.g., diaphragm detection), or it may be to obtain the monitoring values of the assembly of the air circuit components, etc.

The data related to the monitoring value refers to the data obtained after the monitoring value is processed. In some embodiments, the data related to the monitoring value may be at least one of an average value, a maximum value, a minimum value, a mean square error value, or the like of the monitoring value in a set time period.

In some embodiments, the relevant data of the monitoring values included in the set time period may be obtained by using the processor of the service sub-platform to calculate the monitoring values of the same type. The set time period may be a historical time period, or a fixed time period, or the like, such as, the past 3 hours, every day from 10:00 to 12:00, every Friday, etc. Only as an example, the calculation manner may include obtaining a maximum value, a minimum value, an average value and/or a mean square error value, etc., which is not limited in the present disclosure. For example, if the set time period is this morning, and a set of monitoring values is obtained for 0.8 hours, 1.3 hours, and 3 hours, the relevant data of the monitoring values may be determined by calculation as an average value of 1.7 hours, a maximum value of 3 hours, and a minimum value of 0.8 hours, and the mean square error value is 2.66.

In some embodiments of this present disclosure, by performing data processing on monitoring values, the specific data processing results may intuitively reflect the production situation (such as production capacity, failure rate, etc.) of the corresponding process nodes, process stages, or process production lines, which is convenient for subsequent data feedback and display to users to increase the role of human judgment in intelligent manufacturing.

Step 230, sending the data processing results to the user platform based on the corresponding information channel in the service platform for displaying to the user.

In some embodiments, the data processing results in the service platform may include data related to monitoring values.

In some embodiments, when the service platform interacts with the user platform, the relevant data of the monitoring values may be sent to the user platform through a designated information channel. The service platform may transmit the relevant data of the monitoring values through the designated information channel according to the data source of the monitoring values. For more descriptions about using the specified information channel for data transmission, please refer to step 220 and its related descriptions.

In some embodiments, the user platform is configured to present data related to the received monitoring values to the user. Just as an example, after the user platform obtains the result data package including the relevant data of the monitoring value generated by the service platform through data processing, the result data package may be parsed, and through the human-computer interaction method on the user platform, the user platform may display the data processing results in the service platform to the user by displaying the numerical value on the screen, displaying the curve or schedule associated with the numerical value, etc.

In some embodiments of this present disclosure, the data processing results may be visually displayed to the user, and the production situation (including the production capacity or failure rate) of the corresponding process nodes, process stages, or process production lines may be visually reflected, so as to deal with the relevant problems in the intelligent manufacturing process in a timely manner, and further optimize the production capacity of the production line.

In some embodiments of the present disclosure, the production line involves multiple manufacturing equipment, multiple process nodes, and multiple process stages, when intelligent manufacturing is performed according to the production line, there is a streamline relationship between each equipment, process node, etc. Through reasonable module function layout and control method optimization, the overall debugging of the production line may be facilitated, so that each link of the entire production line may be coordinated in an orderly manner and adjusted in time to obtain or determine the maximum production line capacity output.

In some embodiments of this present disclosure, the basic data processing of the service platform is centrally set or the control program framework for the object platform is centrally set, and the specific parameters in the control program are set by using the data interaction between the user platform and the management platform, so a as to simplify the structural deployment of the physical system of the Industrial Internet of Things and facilitate complete the backup or reset of basic data or control programs and protect the basic data or control programs. The normal operation of the entire physical system and functional system are ensured using the data processing capabilities of the service platform.

It should be noted that the above descriptions of process 200 is only for example and explanation, and not limit the scope of application of this disclosure. For those skilled in the art, various modifications and changes can be made to process 200 under the guidance of this disclosure. However, these modifications and changes are still within the scope of the present disclosure.

In some embodiments, considering the problem of industrial Internet of Things system optimization, a technical solution is proposed in which the object platform itself has a storage function. Specifically, the object platform may be configured to automatically store monitoring values in the database of the object platform.

Since the data obtained by the object platform is in the process of transmission, when the abnormal network connection of the sensor network platform is abnormal or the data transmission causes data loss in the service platform due to the problem of the data transmission volume within a certain period of time, by the query return instruction, each service sub-platform may obtain the corresponding monitoring value from the database of the object platform through supplementary entry or full update, so as to ensure the orderly operation of the service platform.

In some embodiments, the specific data transmission mode of the object platform and the service platform is set as: the service platform configured to send a query return instruction to the object platform, and the object platform configured to automatically send the monitoring values stored in the object platform database to the service platform in response to the query return instruction sent by the service platform. The query return instruction refers to an instruction that may be sent by the service platform to obtain relevant data. For example, the query return instruction may be an instruction for obtaining the monitoring values of the product detection link of the object platform from April 1st to April 30th.

In some embodiments, the service platform may send the query return instruction to the object platform in a certain triggering manner. In some embodiments, the triggering manner of the query return instruction may include an active triggering and a passive triggering. The active triggering may be triggered by the service platform itself to generate a query return instruction. The passive triggering may be triggered a query return instruction according to a data instruction of another platform (e.g., the user platform).

In some embodiments, the service platform may receive a data request from the user platform and send a query return instruction to the object platform according to the data request sent by the user platform. The data request refers to an instruction issued by the user platform to request data acquisition. Exemplarily, the user platform may send a data request for obtaining the monitoring value of the diaphragm detection, and the service platform sends the query return instruction to the object platform according to the request to obtain the monitoring value data of the diaphragm detection. It should be understood that using the user platform to trigger the sending of the query return instruction may be a passive triggering, and the specific related factors may be understood as an artificial way generated by the human-computer interaction between the user platform and the operator.

In some embodiments, when the service platform determines that there is data missing in the database thereon, the service platform may send a query return instruction to the object platform. In some embodiments, when it is determined that the database in the service platform has data missing, the service platform may generate a query return instruction to obtain the corresponding missing data and send the query return instruction to the object platform to obtain the missing monitoring value data. For example, when the service platform detects that the monitoring value of product assembly is missing in the database from 8:00 am to 8:10 am on April 20, the service platform automatically generates the corresponding query return instruction and sends the query return instruction to the object platform.

It should be understood that the use of the service platform to determine the triggering of the sending of the query return instruction may be an active triggering, and the specific triggering factor may be determined by the service platform through the statistical results of the monitoring value fragmentation flags. In some embodiments, the actively triggered judgment logic may be set on the service platform, so as to facilitate centralized storage or centralized management of industrial Internet of Things control programs. In terms of program execution, the specific program execution may only use the service platform, or may play the management function through the service platform, store the specific program on the management platform, and distribute it to the service sub-platform when it needs to execute the specific program in whole or in part, so that the service platform may send the query return instruction through directly or through the instruction transmission path, according to obtaining of the monitoring value on each service sub-platform.

In some embodiments, the service platform may determine whether the data is missing or not by the statistical result of the fragmentation flag of the monitoring value. Just as an example, if the monitoring value data is too large, it is easily lost during transmission, so a maximum transmission unit (MTU) is specified for the size of each data frame. MTU indicates the maximum size (e.g., 64 bytes, 512 bytes, etc.) of the data service unit that the data receiver can accept. Therefore, in order to transmit the data completely, the monitoring value data frame is divided into MTU-sized fragmented packets. A fragment flag field in the network layer protocol in the monitoring value data frame may indicate whether it is fragmented. The fragment flag field includes a fragment flag segment Don't Fragment (DF) and a fragment flag segment More Fragment (MF). The fragment flag segment DF indicates whether to allow fragmentation, 0 refers to yes, and 1 refers to not allowed. The fragment flag segment MF indicates whether the monitoring value data packet is the last piece, 0 refers to the last piece, and 1 refers to that it is not the last piece. For example, if the packet is not fragmented, the fragment flag DF will be set to 1, and the fragment flag MF will be set to 0. When the fragment flag segment MF in a continuous monitoring value data frame is 1, and the fragment flag segment MF of the following data frame is not 0, it indicates that the monitoring value data frame is missing, that is, there is data missing in the database.

In some embodiments, the object platform may have storage capabilities. During the process of the data collector monitoring the working parameters of the production line equipment performing manufacturing, the object platform may automatically store the monitoring values obtained by the timer in the database of the object platform. For example, the object platform may store the monitoring values obtained by a timer into the database in real time. As another example, the object platform may periodically (for example, 18:00 p.m. every night, 10:00 a.m. every Saturday, etc.) store the monitoring values obtained by the timer into the database of the object platform.

In some embodiments, in response to the query return instruction sent by the service platform, the object platform may automatically send the monitoring values stored in the database of the object platform to the service platform. For example, the query return instruction issued by the service platform is to send the monitoring values of the product detection link in the object platform from 8:00 to 18:00 on March 20 to the service platform. After receiving the query return instruction, the object platform may send the corresponding monitoring values to the service platform. As another example, when the service platform detects that the monitoring values of the module assembly is missing in the database from 16:00 to 16:02 on March 31, the service platform automatically generates a query return instruction and sends the query return instruction to the object platform. After the object platform receives the query return instruction, it may send the corresponding monitoring values of the module assembly from 16:00 to 16:02 in the afternoon on March 31 to the service platform.

In some embodiments of this present disclosure, during the transmission of the data obtained by the object platform, when there is abnormal network connection of the sensor network platform or data loss due to the problem of data transmission within a certain period of time, the data reception of the service platform may be optimized by actively sending a query return instruction or passively sending a query return instruction. It enables the sub-platforms of each service platform to obtain the monitoring value data results concerned from the database of the object platform by means of supplementary entry or all updates, so as to achieve the purpose of ensuring the orderly operation of the service platform.

Figure 3:
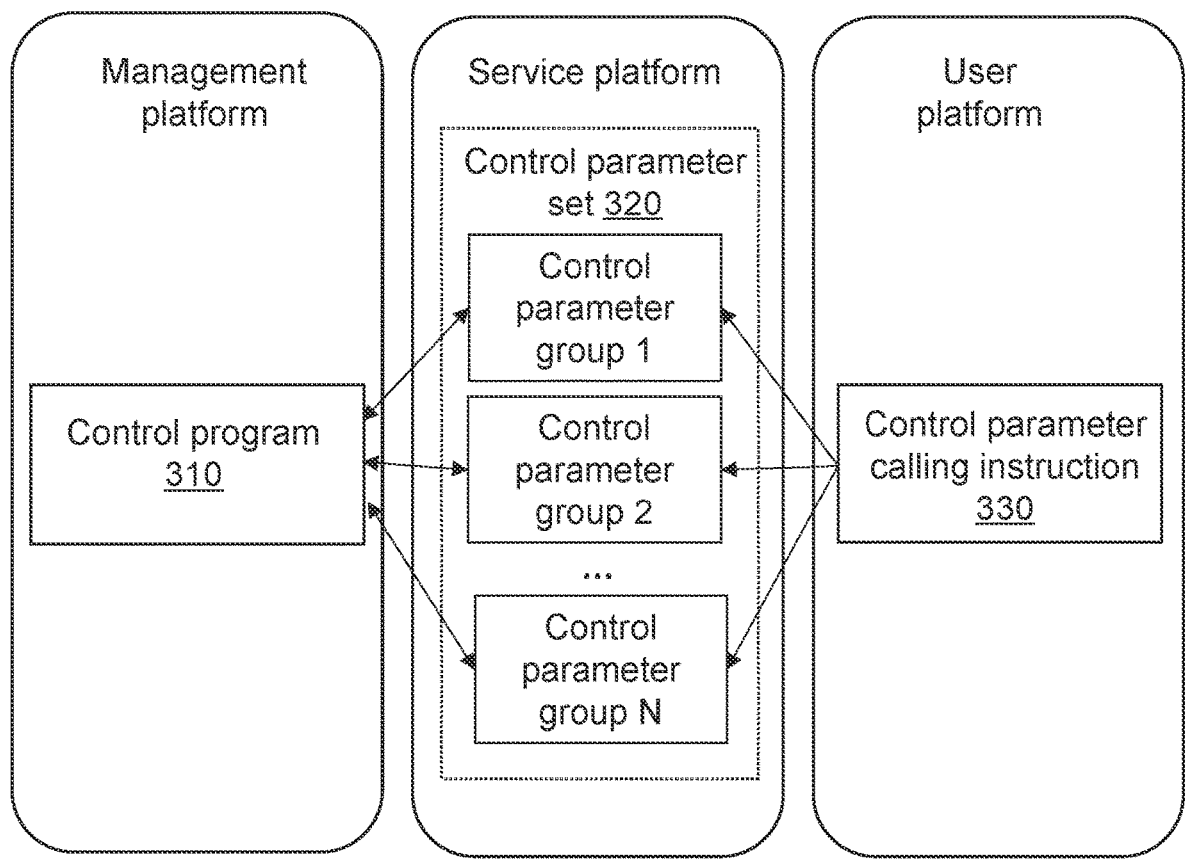
FIG. 3 is an exemplary flowchart illustrating a process for calling control parameters according to some embodiments of the present disclosure.

FIG. 3 is an exemplary schematic diagram illustrating calling control parameters according to some embodiments of the present disclosure.

In some embodiments, as a kind of centralized setting of basic data processing or centralized setting of object platform control program framework, the data interaction is used with the management platform to set specific parameters in the control program to achieve: simplifying the structural deployment of the physical system of the Industrial Internet of Things, facilitating the backup or reset of basic data or control programs, facilitating the protection of basic data or control programs, and using the data processing capabilities of the service platform to ensure the normal operation of the entire physical system and functional system. The Industrial Internet of Things may be configured as: the management platform configured to store a control program 310 that drives the equipment of the production line to work, the service platform is configured to store a control parameter set 320 associated with the control program 310 in the database, the control parameter set including a plurality of control parameter groups.

The control program 310 refers to a program for controlling the operation of the production line equipment, for example, a program that drives the operation of the detection equipment, and a program that drives the operation of the assembly equipment.

The control parameter set 320 refers to a set of parameters used to control the operation of the production line equipment. For example, the control parameter set 320 may be a set of control parameters corresponding to the running speed of each production line equipment, and a set of control parameters corresponding to the processing time of each production line equipment.

In some embodiments, the control parameter set 320 may include multiple control parameter sets. For example, as shown in FIG. 3, the control parameter set 320 may include a control parameter group 1, a control parameter group 2, and a control parameter group N. In some embodiments, each set of control parameters may include control parameters that control the operation of production line equipment of at least one process node, process stage, and/or line equipment in a process production line. For example, the control parameter group may include control parameters for the operation of the parts production equipment and may also include the control parameters for the operation of the product detection equipment, or the like.

In some embodiments, the control parameter set 320 may also include a production line equipment worksheet. The production line equipment worksheet may be used to set a start-stop sequence and a running speed of the production line equipment corresponding to different process nodes, process stages, or process production lines on the time axis. For more descriptions of the production line equipment worksheet, please refer to the related content in FIG. 4 and related descriptions.

In some embodiments, when the service platform interacts with the management platform, the control program 310 may call any control parameter groups to drive the production line equipment to work.

In some embodiments, each service sub-platform in the service platform may be stored corresponding to different control parameter groups, the management platform corresponds to different types of timers (i.e., a single type of timer used to monitor a single type of data), and calls control parameter groups from different service sub-platforms to control the corresponding type of timers.

In some embodiments, the control program 310 may also call one or more control parameter groups according to program logic to drive the corresponding production line equipment to work. Just as an example, the control parameter group includes a control parameter group G for part machining, a control parameter group H for part detection, and a control parameter group I for module assembly. The first step of the control program is to drive the part processing equipment (such as material conveyor belt, molding equipment, etc.) to work, and then the control program may call the control parameter group G of the part processing equipment. In the control program, it is necessary to drive the parts detection equipment (such as X-ray detector, etc.) and the module assembly equipment (such as gasket machine, etc.) to work synchronously, and then the control program may call the control parameter group H for part detection and the control parameter group I for module assembly.

In some embodiments, the interaction between the user platform and the service platform includes: sending a control parameter calling instruction 330 to the service platform through the user platform, the service platform receiving the control parameter calling instruction 330 and sending the control parameter groups in the control parameter calling instruction 330 to the management platform.

The control parameter calling instruction 330 refers to an instruction for calling a required control parameter group. For example, the control parameter calling instruction may be an instruction for calling a control parameter group for part processing.

In some embodiments, the user platform may input the control parameter calling instruction 330 by a user (e.g., a production line equipment operator). After receiving the control parameter calling instruction 330, the service platform may deliver the control parameter group in the control parameter calling instruction 330 to the management platform. After the management platform obtains the control parameter group stored on the service platform through data interaction, it may control the operation of the production line equipment in the object platform according to the specific parameters set in the control parameter group. For example, the control parameter calling instruction A input by the user includes a control parameter group related to module assembly. After receiving the control parameter invocation instruction A, the service platform sends the control parameter group related to the module assembly to the management platform. After the management platform obtains the control parameter group related to the module assembly, according to the specific parameters set in the control parameter group, the module assembly production line equipment (such as gasket machine, etc.) in the object platform is controlled to work.

In some embodiments of this present disclosure, through the human-computer interaction between the user platform and the user, the user's will is fed back to the management platform through the control parameter group in the service platform, under the control of the management platform, the object platform may perform production and manufacturing according to the user's will, and the above will is conveyed or expressed through control parameter calling instructions.

In some embodiments, through the interaction between the user platform and the service platform, at least one operation of control parameter modification, control parameter group deletion, and control parameter group addition may be performed on the control parameter group in the service platform.

In some embodiments, the user platform may receive control parameter adjustment instructions (e.g., control parameter modification, control parameter group deletion, and control parameter group addition, etc.) input by the user, the user platform sends the control parameter adjustment instruction to the service platform, and the service platform may perform corresponding operations according to the content of the instruction. For example, the user platform receives an instruction to modify the control parameters of product detection and sends it to the service platform, and the service platform modifies the control parameters of product detection stored in its platform according to the content of the instruction.

In some embodiments of this present disclosure, through the data interaction between the user platform and the service platform, the control parameter group may be changed according to the actual needs of the user, so as to adjust the operation mode of the production line equipment in the object platform to further optimize the production of the production line.

In some embodiments of this present disclosure, the service platform is used to uniformly store the control parameters and data processing capabilities of the equipment of the production line, which simplifies the structural deployment of the physical system of the Industrial Internet of Things, facilitates the completion of the backup or reset of basic data or control programs, protects basic data or control programs, and ensures the stability of the physical system of the entire Industrial Internet of Things and the normal operation of the functional system.

In some embodiments, in order to enable the management platform to actively control the object platform under the combination of process settings and actual operating conditions and simplify the structural deployment of the management platform and the sensor network platform, the management platform and the sensor network platform may adopt a centralized arrangement. The centralized arrangement is that the platform uniformly receives data, uniformly processes data, and uniformly sends data. In some embodiments, the sensor network platform may uniformly send the monitoring values from the data collector to the management platform.

Figure 4:
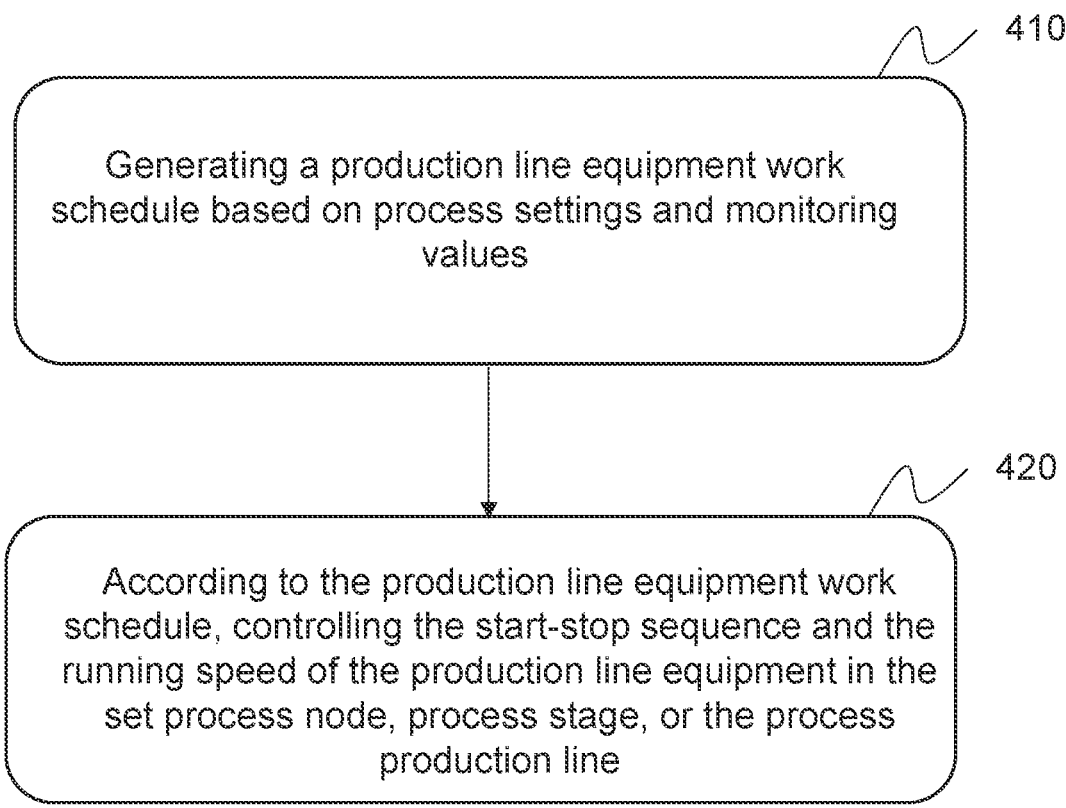
FIG. 4 is an exemplary flowchart illustrating a process for controlling a start-stop sequence and a running speed of the production line equipment according to some embodiments of the present disclosure.

FIG. 4 is an exemplary flowchart illustrating a process for controlling a start-stop sequence and a running speed of production line equipment according to some embodiments of the present disclosure. In some embodiments, the process 400 may be performed by the management platform. As shown in FIG. 4, the process 400 includes the following steps:

Step 410, generating a production line equipment work schedule according to the process settings and the monitoring values.

The production line equipment work schedule may be a schedule for timing control of each link in the production process. In some embodiments, the production line equipment work schedule may be a control parameter set of execution data required by the control program, and the control program performs time sequence control on the covered production line in combination with the production line equipment work schedule. In the entire production line, the production line equipment worksheet may set different process nodes, process stages, or process production lines corresponding to the production line equipment start and stop sequence on the time axis according to the specific process flow, so as to realize the efficient connection between different process nodes, process stages, or process production lines. For example, the production line equipment work schedule may include the processing sequence of each production line equipment, which may be: parts processing equipment, parts detection equipment, module assembly equipment, module detection equipment, product assembly equipment, and product detection equipment. The production line equipment work schedule may also include the production line equipment (e.g., parts processing equipment) working hours, which are 09:00~10:50, 11:00~12:50, 13:00~14:50, 15:00~16:50 every day.

In some embodiments, the management platform may generate production line equipment work schedules based on process settings and monitoring values. In some embodiments, the management platform may acquire worker characteristics, date characteristics, and time period characteristics of on-duty workers corresponding to at least one process in the process setting, as well as the average time consumption of at least one process. The management platform may determine the predicted time consumption of at least one process through a time consumption prediction model based on worker characteristics, date characteristics, time period characteristics, and average time consumption, and generate a production line equipment work schedule based on the predicted time consumption. For more descriptions about generating a production line equipment work schedule, please refer to FIG. 5 and its related descriptions.

In some embodiments, after the management platform generates the production line equipment work schedule, by interacting data with the service platform, the management platform compares the generated production line equipment work schedule with the preset production line equipment work schedule under the direction of the index data, and according to the comparison result decision logic set and stored in the management platform database, it is determined whether to execute the generated production line equipment work schedule. For more details about confirming whether to execute the generated production line equipment work schedule, please refer to FIG. 7 and its related descriptions.

Step 420, according to the production line equipment work schedule, controlling the start-stop sequence and running speed of the production line equipment in the set process node, process stage, or the process production lines.

In some embodiments, the start-stop sequence refers to the time node at which the production line equipment starts the manufacturing action and the time node at which the production line equipment stops the manufacturing action. In some embodiments, the start-stop sequence may be used to determine the start-stop sequence of the corresponding production line equipment of different process nodes, process stages, or process production lines on the time axis. For example, an exemplary start-stop sequence may be: parts processing equipment starting at 09:00, 11:00, 13:00, 15:00 every day, and stopping at 10:50, 12:50, 14:50, 16:50 every day. The parts detection equipment is started after the parts processing equipment is started for 10 minutes, and turned off after the parts detection equipment is started for 30 minutes. The module assembly equipment is started after the parts detection equipment is turned off for 10 minutes after the module assembly equipment starts up for 110 minutes, etc.

The running speed refers to the speed at which the production line equipment performs production activities. In some embodiments, the running speed may be represented by the number of finished products processed through the production line equipment per unit time, For example, 30 pieces/minute, 1000 pieces/hour, 5000 pieces/day, etc.

In some embodiments, the control program in the management platform may control the start-stop sequence and running speed of the production equipment in the set process node, process stage, or the process production line by loading the production line equipment work schedule. For example, the production line equipment work schedule may instruct the product detection instrument to start at 09:00 and stop at 18:00, and the running speed is 400 pieces/hour. Then the control program may start the product detection instrument at 09:00 and turn off the product detection instrument at 18:00 by loading the production line equipment work schedule, and the running speed is 400 pieces/hour.

In some embodiments of this present disclosure, the management platform may control the start-stop sequence and running speed of the production equipment in the set process node, process stage or the process production line by loading the production line equipment work schedule, so as to realize the efficient connection between different process nodes, process stages, or process production lines. Since the aforementioned time sequence or connection is related to the running speed during the execution of the manufacturing action of the production equipment, setting the data corresponding to the running speed in the production line equipment work schedule as the embodiment of the action on the production line equipment may further improve the production efficiency.

Figure 5:
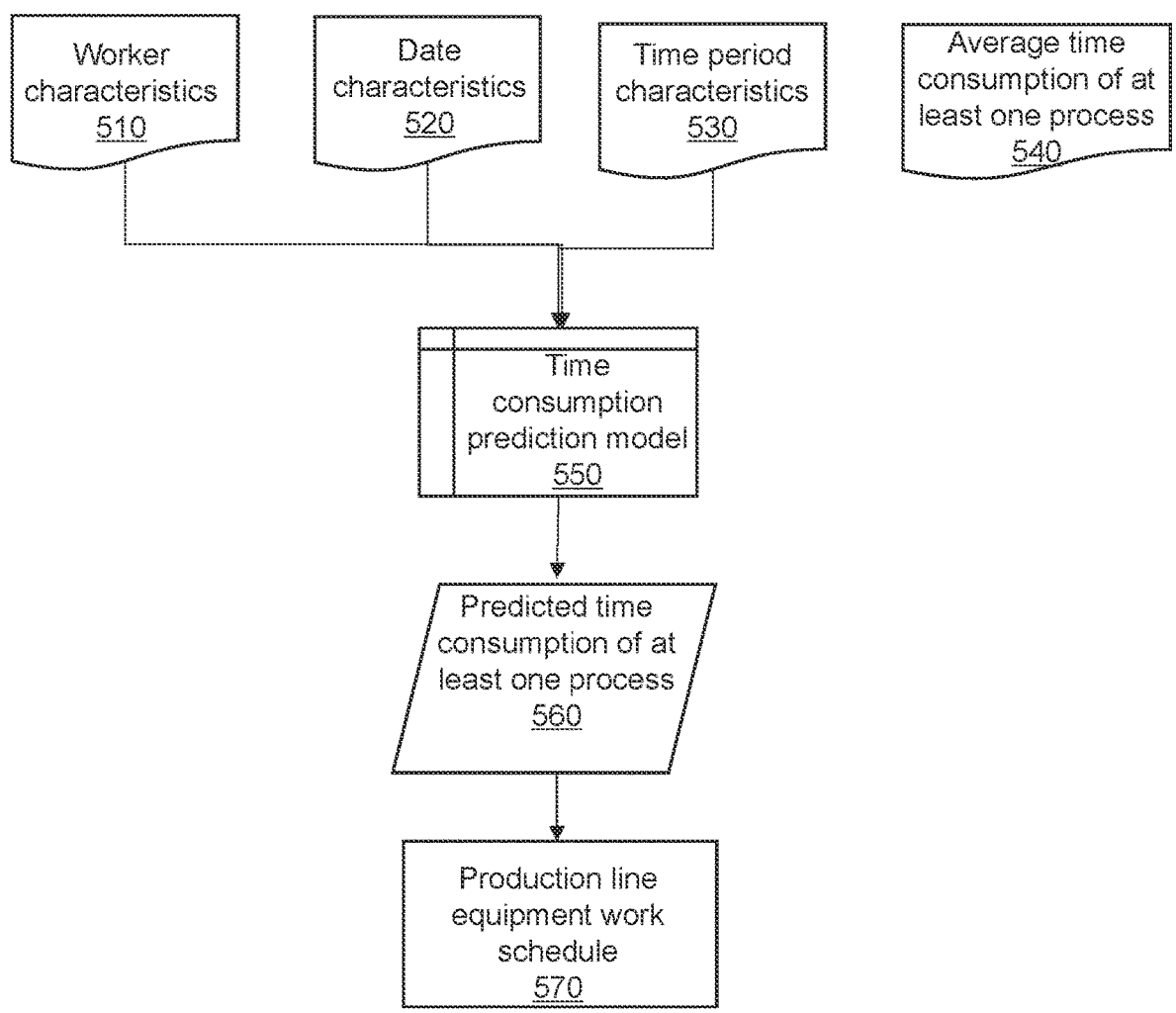
FIG. 5 is an exemplary schematic diagram illustrating determination of an operation schedule of the production line equipment according to some embodiments of the present disclosure.

FIG. 5 is an exemplary schematic diagram of determining a production line equipment work schedule according to some embodiments of the present disclosure.

In some embodiments, the management platform is configured to obtain worker characteristics 510, date characteristics 520, and time period characteristics 530 of on-duty workers corresponding to at least one process in the process setting, as well as average time consumption 540 of at least one process.

At least one process in the process setting may refer to a process corresponding to one link of the production line. For example, at least one process in the process setting may include at least one of part processing, part detection, module assembly, module detection, product assembly, and product detection.

The on-duty workers may refer to a person who does production work in a shift for the same process. In some embodiments, a process may correspond to multiple shifts, and each shift may have a different on-duty worker. The shifts may include morning shifts (e.g., 08:00-12:00), evening shifts (e.g., 12:00-18:00), or the like. Correspondingly, the on-duty workers corresponding to different processes and/or different shifts may be different. For example, an on-duty worker performing part detection is different from an on-duty worker performing module assembly within the same shift.

The worker characteristics may refer to characteristics related to the working conditions of on-duty workers. In some embodiments, the worker characteristics may include on-duty worker experience points, on-duty worker productivity, or the like. The experience value of the on-duty workers may be determined based on the length of service of the on-duty worker engaged in the current process. For example, the higher the length of service of an on-duty worker in a process is, the higher the experience value is. In some embodiments, the experience value of the on-duty workers may be obtained through records in the talent database. For example, the length of service of the worker may be recorded in the talent database in advance, and the experience value of the worker may be determined according to the length of service. Exemplarily, workers with 0-1 years of service may determine the experience value as 0-10%, workers with 1-3 years of service may determine the experience value as 10%-40%, workers with 3-5 years of service may determine the experience value as 40%-70%, etc. The productivity of on-duty workers may refer to amount of finished products produced by on-duty workers per unit time. In some embodiments, the productivity of on-duty workers may be determined from historical data. For example, the average productivity of a worker over a certain period of time in the past (e.g., last month) may be taken as the worker's current productivity. As another example, the average productivity of the worker in the total working hours in the past (e.g., the total working hours of the worker in the past year) may be taken as the current productivity of the worker.

In some embodiments, the worker characteristics of the on-duty worker may be obtained according to the workers identity information by obtaining the worker's identity information. In some embodiments, the corresponding worker characteristics may be determined according to the relevant data of the workers during historical work, the worker characteristics of the worker and the identity information of the worker are bound and stored, and then the worker characteristics of the worker may be directly obtained by querying the identity information.

In some embodiments, the identity information of worker may be determined from a shift schedule. The shift schedule may include the identity information of the on-duty workers corresponding to each shift of each process. For example, the name of the on-duty worker in the module assembly line 1 during the morning shift on Jan. 8, 2001 may be queried, and the identity information of the on-duty worker may be determined through the system query. In some embodiments, the worker's identity information may also be determined through image recognition. For example, the face image of the on-duty worker may be obtained through the camera, and then the identity information of the worker may be determined based on face recognition.

The date characteristics may be date-related characteristics. In some embodiments, the date characteristics may include the number of weeks, the number of days until a holiday, etc. For example, the date characteristics may include Monday, four days before the Labor Day, etc.

In some embodiments, the date characteristics may be obtained through a production calendar. For example, the production calendar may include the production line's production and production suspension arrangements, and the production calendar may be obtained by querying the system to obtain date characteristics.

The time period characteristics may be characteristics related to a work period. In some embodiments, the time period characteristics may be the length of time that has been worked during the shift time, the time period in which the current shift is located, or the like. For example, the time period characteristics may be that two hours have been worked. As another example, the time period characteristics may also be 08:00-12:00. It is worth noting that the date characteristics and time period characteristics may reflect the work status of workers. For example, when the date characteristic is that there is still one day before the Labor Day, the working state of the workers may be better, and the corresponding productivity may be higher.

In some embodiments, the time period characteristics may be determined from the shift schedule and the current time. For example, in the shift schedule, on-duty worker A goes to the morning shift, the morning shift starts at 08:00, and the current time is 10:00, then it may be determined that the time period characteristics of on-duty worker A is that he has worked for two hours, and the time period is 08:00-12:00.

The average time consumption may refer to the average of the time required to complete a process. The average time consumption may refer to the average of the time consumption for the same worker to complete a process multiple times, or the average time consumption for multiple workers to complete the same process. For example, if worker A takes 8 hours, 9 hours, and 10 hours to complete multiple parts detection processes, it may be determined that worker A spends an average of 9 hours in the part detection process.

In some embodiments, the average time consumption may be obtained by averaging a plurality of historical monitoring values obtained by a data collector of the object platform. For example, the average time consumption may be determined by the average time consumption of one process in the production process collected by a plurality of timers. In some embodiments, multiple historical monitoring values may also be extracted from the service platform to obtain the corresponding average time consumption.

In some embodiments, the management platform may determine a predicted time consumption 560 of at least one process through a time consumption prediction model 550 based on worker characteristics 510, date characteristics 520, time characteristics 530, and average time consumption 540.

The predicted time consumption may refer to the estimated time required to complete at least one process in the process setting. In some embodiments, the predicted time may be related to the worker characteristics, date characteristics, time period characteristics, and average time consumption of the current process of the on-duty workers. For example, the higher the productivity of on-duty workers is, the shorter the predicted time is. As another example, if the experience value of the on-duty workers is small, the predicted time consumption will be long.

The time consumption prediction model 550 may be used to determine the predicted time corresponding to at least one process. In some embodiments, the time consumption prediction model 550 may be a machine learning model, for example, the time consumption prediction model 550 may be a neural network model such as DNN and BP.

As shown in FIG. 5, the input of the time consumption prediction model 550 may include worker characteristics 510, date characteristics 520, and time period characteristics 530 of the on-duty workers, and the average time consumption 540 of at least one process, the output may be a predicted time consumption 560 of at least one process.

In some embodiments, the predicted time consumption 560 output by the time consumption prediction model 550 may include at least one predicted value and its corresponding confidence level. For example, the predicted time consumption 560 output by the time consumption prediction model 550 may include 4.5 h corresponding to the confidence level of 0.2, 5 h corresponding to the confidence of 0.5, 5.5 h corresponding to the confidence of 0.3.

The parameters of the time consumption prediction model 550 may be obtained through training. In some embodiments, the time consumption prediction model 550 may be derived from multiple labeled training samples. For example, the multiple labeled training samples may be input into the initial time consumption prediction model, a loss function is constructed from the labels and the prediction results of the initial time consumption prediction model, the parameters of the initial time consumption prediction model are iteratively updated based on the loss function, model training is completed when the loss function of the initial time consumption prediction model satisfies a preset condition, where the preset condition may be that the loss function converges, the number of iterations reaches a threshold, or the like.

In some embodiments, the training samples may include sample worker characteristics, sample date characteristics, sample time period characteristics, and average time consumption of at least one sample process of the sample on-duty workers, and the label may be the predicted time consumption of the at least one sample process. In some embodiments, the training samples may be obtained based on historical data, and the labels may be obtained based on human annotations.

In some embodiments of the present disclosure, the predicted time consumption corresponding to each process of the worker can be more accurately determined by the time consumption prediction model, so that the time consumption setting is more suitable for the output situation of the worker, and the productivity of the worker is guaranteed.

In some embodiments, the management platform may generate a production line equipment work schedule 570 based on the predicted time consumption 560 of at least one process.

Due to manual participation, the human factor should be considered when determining the production line equipment work schedule, so the start-stop sequence of the production line in the production line equipment work schedule can be adjusted based on the predicted time consumption.

In some embodiments, the management platform may adjust the average time consumption based on the predicted time consumption to determine the target time consumption. The target time consumption may be used as the time consumption index corresponding to each process. In some embodiments, a time range formed by the predicted time consumption and the average time consumption may be used as a candidate interval, accordingly, the management platform may determine a target time consumption based on the candidate interval. For example, if the average time consumption for process A is 4 h, and the predicted time for worker B to complete process A is 6 h, the candidate interval may be determined to be 4 h-6 h, correspondingly, the target time consumption of worker B may be determined between 4 h-6 h. As another example, if the average time consumption of process C is 4 h, and the predicted time consumption of worker D to complete process C is 3 h, the candidate interval may be determined to be 3 h-4 h, correspondingly, the target time consumption of worker D may be determined between 3 h-4 h. It is worth noting that by adjusting the average time consumption spent by workers in a process based on the predicted time spent by workers in that process, a time consumption index that is more in line with the worker's work ability may be determined.

In some embodiments, in the process of determining the target time consumption by adjusting the average time consumption based on the predicted time consumption, it needs to satisfy that the deviation degree is less than or equal to the deviation degree threshold. The deviation degree may reflect the degree to which the target time consumption deviates from the average time consumption. The deviation threshold may reflect the maximum deviation of the target time from the average time consumption. In some embodiments, the deviation threshold value may be a system default value, an empirical value, a preset value manually, or any combination thereof, and may be set according to actual requirements, which is not limited in this present disclosure. For example, the deviation threshold may be set to be 30%. Exemplarily, the deviation degree may be determined by the following formula (1):

$$\delta = T - t/t \quad (1),$$

where $\delta$ is the deviation degree, T is the target time consumption, and t is the average time consumption.

In some embodiments, the time consumption threshold may be determined based on the deviation threshold. The time consumption threshold is the maximum threshold of the time consumption index corresponding to each process. In some embodiments, the target interval may be further determined among the candidate intervals according to the time consumption threshold. The target interval is the time range between the average time consumption and the time consumption threshold. Correspondingly, the target time consumption may be any value between target intervals. For example, when the deviation threshold is 30% and the average time consumption is 4 h, the predicted time is 6 h, the time consumption threshold corresponding to the deviation threshold may be determined by the above formula (1) to be 5.2 h, then the candidate interval may be determined to be 4 h-6 h, and further according to the time consumption threshold of 5.2 h, the target interval may be determined to be 4 h-5.2 h, that is, the target time may be any value between 4 h-5.2 h. As another example, the deviation threshold is −10%, the average time consumption is 4 h, the predicted time consumption is 3 h, the time consumption threshold corresponding to the deviation threshold may be determined by the above formula (1) to be 3.6 h, then the candidate interval may be determined to be 3 h-4 h, and the target interval may be determined to be 3.6 h-4 h according to the time consumption threshold of 3.6 h, that is, the target time may be any value between 3.6 h-4 h.

In some embodiments, when determining the target time consumption, it is only necessary to satisfy the target time consumption to be any value between the average time consumption and the time consumption threshold (e.g., the target interval). Correspondingly, the target time consumption may be a time period, and at this time, the time consumption threshold and the average time consumption corresponding to the deviation degree threshold may be used as boundary values of the scope of the target time consumption. In some embodiments, there is a situation that the time consumption threshold exceeds the candidate interval, and in this case, the candidate interval may be directly determined as the target interval. For example, the deviation threshold is −30%, the average time consumption is 4 h, the predicted time consumption is 3 h, it may be determined by the above formula (1) that the time consumption threshold corresponding to the deviation threshold is 2.8 h, and the candidate interval may be determined to be 3 h-4 h. At this time, the time consumption threshold of 2.8 h exceeds the range of the candidate interval. Then the candidate interval may be directly determined as the target interval (i.e., 3 h-4 h), that is, the target time consumption may be any value between 3 h-4 h.

In some embodiments, the candidate time consumption index may also be uniformly set artificially based on experience, and then the target time consumption is determined according to the magnitude relationship between the candidate time consumption index and the average time consumption. In some embodiments, when the predicted time consumption corresponding to at least one process is higher than the candidate time consumption index, the candidate time consumption index may be determined as the target time consumption. For example, if the candidate time consumption index is 5 hours, if the predicted time consumption of the on-duty worker A determined by the time consumption prediction model is 6 hours, the target time consumption may be determined to be 5 hours. In some embodiments, when the predicted time consumption corresponding to at least one process is lower than the candidate time consumption index, the predicted time consumption may be processed according to a preset ratio (e.g., 0.9, 0.95, etc.) to determine the target time consumption. For example, the candidate time consumption index is 5 h, and the preset ratio is 0.9, if the predicted time consumption of on-duty worker B determined by the time consumption prediction model is 4 h, the target time consumption may be determined to be 3.6 h (4 h*0.9=3.6 h). In this case, when the worker's predicted time consumption for a process is lower than the candidate time consumption index, by determining the target time consumption by processing the predicted time consumption according to a preset ratio, workers may be motivated to increase their production rate, so that the target time consumption may be more adapted to the output of the workers.

In some embodiments, after determining the target time consumption, the management platform may generate a production line equipment work schedule according to the target time consumption of each process and the process sequence of each process. For example, the target time consumption of process A is 8 h, the target time consumption of process B is 6 h, the target time consumption of process C is 10 h, the process sequence of process A, B, and C is that after process A is completed, process C needs to be performed, and after process C is completed, process B needs to be performed, the generated production line equipment work schedule is: on May 5, 2020, the production line equipment corresponding to process A is turned on between 08:00~12:00 and 13:00~18:00; on May 6, 2020, the production line equipment corresponding to process C will be turned on between 08:00~12:00 and 13:00~16:00; the production line equipment corresponding to process B is be turned on between 16:00~18:00 on May 6, 2020, 08:00~12:00, and 13:00~18:00 on May 7, 2020.

In some embodiments of the present disclosure, when determining the predicted time consumption by the worker characteristics, date characteristics, time period characteristics, and average time consumption of the current process of the on-duty workers, the influence of uncertain factors such as different workers' abilities, schedules, holidays, and other uncertain factors on the production situation is fully considered, so that the predicted time consumption is closer to the actual production situation and more accurate. Further, it is possible to set a production line equipment work schedule for the on-duty workers that is more suitable for the workers' output and scheduling situation, providing a more accurate basis for accurate production arrangements and improving the productivity of the production line.

In some embodiments, when the average time consumption of at least one process in the process setting exceeds the target time consumption corresponding to the process, the management platform may also control a timer to remind, the reminding content including the proportion that the average time consumption of at least one process exceeds the target time consumption. For example, the reminder content may be "the target time consumption is 10 h, and the current timeout is 10%".

In some embodiments, the management platform may control the timer to remind according to a certain reminder frequency. The reminder frequency may be the frequency at which the management platform controls the timer to remind. In some embodiments, the reminder frequency is related to the timeout ratio. For example, the higher the timeout ratio is, the higher the reminder frequency is. The timeout ratio may be the ratio in which the average time consumption exceeds the target time consumption. In some embodiments, the timeout ratio may be determined according to the target time and average time consumption. Exemplarily, the timeout ratio may be determined by formula (2):

$$\alpha = \frac{t-T}{T} \times 100\%, \quad (2)$$

where α is the timeout ratio, T is the target time consumption, and t is the average time consumption.

In some embodiments, different reminder frequencies may be determined according to the size of the timeout ratio. For example, when the size of the timeout ratio exceeds the preset threshold, the reminder frequency may be set to remind every 5 minutes. When the size of the timeout ratio does not exceed the preset threshold, the reminder frequency may be set to remind them every 10 minutes.

In some embodiments, the reminder frequency may also be related to the deviation degree of the target time consumption from the average time consumption. In some embodiments, the greater the absolute value of the deviation is, the higher the reminder frequency is. For example, the absolute value of the deviation degree is 30%, 0%-30% may be divided into 3 intervals: 0-10%, 10-20%, 20-30%, each interval corresponds to a different reminder frequency. The reminder frequency from low to high in the deviation interval may be: once every 10 minutes, once every 8 minutes, once every 4 minutes, etc.

In some embodiments of the present disclosure, the reminder frequency is determined based on the timeout ratio and the degree of deviation, and more accurate differentiated reminders may be performed according to the difference between the time consumption situation of different on-duty workers and the target time consumption. At the same time, the higher the timeout ratio is, the higher the reminder frequency is, which may enhance the incentive and supervision of workers and remind them to improve efficiency.

FIG. 6 is an exemplary flowchart illustrating a process for determining whether to execute a production line equipment work schedule according to some embodiments of the present disclosure.

In some embodiments, the production line equipment work schedule includes a plurality of index data and start-stop sequences of all process nodes, process stages, or production line equipment in the process line, the number of index data is equal to the number of monitoring value types, and logical pointers in different index data are used to point to different process nodes, process stages, or start-stop sequences of production line equipment in the production line equipment work schedule. In some embodiments, the database in the service platform may be configured to store the preset production line equipment work schedule, and the storage method of the preset production line equipment work schedule is: for each type of monitoring value, according to the storage method in the database after the monitoring value is distinguished by type, the monitoring value of this type and the preset production line equipment work schedule that affects the monitoring value of this type are stored in the same database. In some embodiments, the management platform is further configured to perform the following steps.

Step 610, after generating the production line equipment work schedule, by interacting with the service platform, comparing the generated production line equipment work schedule with each preset production line equipment work schedule according to the index data.

The preset production line equipment work schedule may be a preset production line equipment work schedule, and its meaning is similar to the production line equipment work schedule. For more information about the production line equipment work schedule, please refer to FIG. 4, FIG. 5, and their related descriptions.

In some embodiments, the preset production line equipment work schedule may be pre-stored in a database on the service platform. In some embodiments, the storage method of the preset production line equipment work schedule is: for each type of monitoring value, according to the storage method in the database after the monitoring value is distinguished by type, the monitoring value of this type and the preset production line equipment work schedule that affects the monitoring value of this type are stored in the same database. The purpose of the preset production line equipment work schedule and the storage method of monitoring values is to: for each type of monitoring value, the preset production line equipment work schedule that affects the monitoring value is stored on the same service platform sub-platform, which may achieve the purpose of facilitating the sub-platform supervision and control of various types of monitoring values.

The index data may be a logical pointer for pointing to different process nodes, process stages, or start-stop sequences of production equipment in the process line in the production line equipment work schedule. Through the index data, it is possible to quickly find the production line equipment work schedule and the start-stop sequence of different process nodes, process stages or production line equipment in the pre-set production line equipment work schedule.

In some embodiments, after the management platform generates the production line equipment work schedule, by interacting data with the service platform, the management platform may compare the generated production line equipment work schedule with the preset production line equipment work schedule under the direction of the index data.

In some embodiments, in order to reduce business latency, the number of index data is configured to be consistent with the number of types divided by monitoring values. At the same time, by specifying the corresponding relationship between the preset production line equipment work schedule and the monitoring value type, a certain type of monitoring value may be found in the production line equipment work schedule according to the index data, the search results may be compared with the monitoring values of the type in the preset production line equipment work schedule, for example, whether each control data exceeds the preset threshold, whether the relationship between each control data is equivalent to the related relationship in the preset production line equipment work schedule, etc., then so as to obtain whether the production line equipment work schedule is an executable production line equipment work schedule.

Step 620, according to the comparison result decision logic, determining whether to execute the generated production line equipment work schedule.

The comparison result decision logic may refer to a preset determination condition for judging whether to execute the production line equipment work schedule according to the comparison result. In some embodiments, the comparison result decision logic may include determining whether the start and stop sequences of the corresponding processes in the production line equipment work schedule and the preset production line equipment work schedule are the same. In some embodiments, the comparison result decision logic may include determining whether the difference between the start-stop sequence of the corresponding process in the production line equipment work schedule and the preset production line equipment work schedule satisfies a certain threshold. In some embodiments, the comparison result decision logic may be set according to actual requirements, which is not limited in this present disclosure.

In some embodiments, whether to execute the generated production line equipment work schedule may be determined according to the comparison result decision logic set stored in the database of the management platform. In some embodiments, when the comparison result satisfies the comparison result decision logic, it is determined to execute the production line equipment work schedule. On the contrary, if the comparison result decision logic is not satisfied, it is determined that the production line equipment work schedule is not executed.

In some embodiments of this present disclosure, by comparing the production line equipment work schedule with the preset production line equipment work schedule, on the one hand, the preset production line equipment work schedule may be used to constrain the data or data range in the production line equipment work schedule that may be executed, so as to provide execution protection for the control program. On the other hand, for each type of monitoring value, the preset production line equipment work schedule that affects the monitoring value is stored on the same service sub-platform in service platform, which may achieve the purpose of facilitating the sub-platform supervision and control of various types of monitoring values.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure, for example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated.

Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An Industrial Internet of Things of an independent service platform, comprising: a user platform, a service platform, a management platform, a sensor network platform, and an object platform that interact in sequence, wherein:
the object platform includes a data collector that monitors operating parameters of a production line equipment performing manufacturing, the data collector includes at least one timer, the at least one timer is configured to obtain monitoring values of a process node, a process stage, or a process production line set in a production process to complete a set function, wherein a corresponding relationship is between the at least one timer and the database of the service platform in data transmission, the corresponding relationship refers to that a single database receives a single type of data, and the data in the single database is processed by an independent processor and transmitted by an independent information channel;
the management platform is configured to:
receive the monitoring values from the at least one timer through the sensor network platform; and
according to data source of the monitoring values, distribute the monitoring values to corresponding service sub-platforms of the service platform;
the service platform is configured to:
use different service sub-platforms for storage, data processing and/or data transmission of different types of data, wherein the different service sub-platforms correspond to independent databases, processors, and information channels; and
send a data processing result in the service platform to the user platform via a corresponding information channel for displaying to a user.

2. The Industrial Internet of Things of the independent service platform of claim 1, wherein:
the service platform is configured to send a query return instruction to the object platform;
the object platform is configured to automatically store the monitoring values in a database of the object platform, and
in response to the query return instruction sent by the service platform, the monitoring values stored in the database of the object platform database are automatically sent to the service platform.

3. The Industrial Internet of Things of the independent service platform of claim 2, wherein to send the query return instruction to the object platform, the service platform is configured to
receive a data request from the user platform, and send the query return instruction to the object platform according to the data request sent by the user platform; or
when missing data exists in the database of the service platform, sending the query return instruction to the object platform.

4. The Industrial Internet of Things of the independent service platform of claim 1, wherein to perform the data processing in the service platform:
the processor of the service platform is configured to calculate relevant data of the monitoring values included in a set time period according to preset rules or a data request of the user platform, and send the relevant data of the monitoring values to the user platform through the information channel; and
the user platform is configured to display the received relevant data of the monitoring values to the user.

5. The Industrial Internet of Things of the independent service platform of claim 1, wherein:
the management platform is configured to store a control program that drives operation of the production line equipment; and
the service platform is configured to store a control parameter set associated with the control program in the database of the service platform, and the control parameter set includes a plurality of control parameter groups; wherein
an interaction between the service platform and the management platform includes: calling any of the control parameter groups to drive the production line equipment to operation by the control program; and
the interaction between the user platform and the service platform includes: sending a control parameter calling instruction to the service platform through the user platform and receiving the control parameter calling instruction and sending the control parameter groups in the control parameter calling instruction to the management platform by the service platform.

6. The Industrial Internet of Things of the independent service platform of claim 5, wherein the interaction between the user platform and the service platform further includes:
through the interaction between the user platform and the service platform, performing at least one operation of control parameter modification, control parameter group deletion, and control parameter group addition on the control parameter groups of the service platform.

7. The Industrial Internet of Things of the independent service platform of claim 1, wherein
the sensor network platform is configured to uniformly send the monitoring values from at least one timer to the management platform;
the management platform is configured to:
generate an operation schedule of the production line equipment according to process setting and the monitoring values;
according to the operation schedule of the production line equipment, control a start-stop sequence and a running speed of the production line equipment in the process node, the process stage, or the process production line, wherein the start-stop sequence is a time node when the production line equipment starts a manufacturing action and a time node when the production line equipment stops the manufacturing action.

8. The Industrial Internet of Things of the independent service platform of claim 7, wherein to generate the operation schedule of the production line equipment according to the processing setting and the monitoring values, the management platform is configured to:
obtain worker characteristics, date characteristics, and time period characteristics of an on-duty worker corresponding to at least one process in the process setting, and average time consumption of the at least one process;
based on the worker characteristics, the date characteristics, the time period characteristics, and the average time consumption, determine a predicted time consumption of the at least one process through a time consumption prediction model; and
based on the predicted time consumption, generate the operation schedule of the production line equipment.

9. The Industrial Internet of Things of the independent service platform of claim 8, wherein the management platform is further configured to:
when the average time consumption of the at least one process in the process setting exceeds a target time consumption corresponding to at least one process, control the timer to remind, wherein reminder content includes a proportion of actual average time consumption of the at least one process exceeding the target time consumption.

10. The Industrial Internet of Things of the independent service platform of claim 7, wherein:
the operation schedule of the production line equipment includes a plurality of index data and all the start-stop sequences of the production line equipment in the process nodes, the process stages, or the process production line, wherein a number of the index data is equal to a number of monitoring value types, and logical pointers in the different index data are configured to point to the start-stop sequences of the production line equipment in the process production line in different process nodes, process stages, or the process production line of the operation schedule of the production line equipment;
the database of the service platform is configured to store a preset operation schedule of the production line equipment, and a storage method of the preset operation schedule of the production line equipment is: for each type of monitoring values, according to a storage method in the database after the monitoring value is distinguished by type, the type of monitoring value and the preset operation schedule of the production line equipment that affects the type of monitoring value are stored in a same database;
the management platform is further configured to:
after generating the operation schedule of the production line equipment, by interacting with the service platform, compare the generated operation schedule of the production line equipment with each preset operation schedule of the production line equipment according to the index data; and
according to comparison result decision logic, determine whether to execute the generated operation schedule of the production line equipment.

11. A control method for an Industrial Internet of Things of an independent service platform, wherein the method is applied to a user platform, a service platform, a management platform, a sensor network platform, and an object platform that interact in sequence, wherein:
the object platform includes a data collector that monitors operating parameters of a production line equipment performing manufacturing, the data collector includes at least one timer, the at least one timer is configured to obtain monitoring values of a process node, a process stage, or a process production line set in a production process to complete a set function, wherein a corresponding relationship is between the at least one timer and the database of the service platform in data transmission, the corresponding relationship refers to a single database receiving a single type of data, and the data in the single database is processed by an independent processor and transmitted by an independent information channel;
the method includes:
receiving the monitoring values from the at least one timer through the sensor network platform; and
according to a data source of the monitoring values, distributing the monitoring values to corresponding service sub-platforms of the service platform;
using different service sub-platforms for storage, data processing, or data transmission of different types of data, wherein the different service sub-platforms correspond to independent databases, processors, and information channels; and
sending a data processing result in the service platform to the user platform via a corresponding information channel for displaying to a user.

12. The control method of the Industrial Internet of Things of the independent service platform of claim 11, wherein the method comprises:
sending a query return instruction to the object platform through the service platform;
automatically storing the monitoring values in a database of the object platform through the object platform, and in response to the query return instruction sent by the service platform, automatically sending the monitoring values stored in the database of the object platform database to the service platform.

13. The control method of the Industrial Internet of Things of the independent service platform of claim 12, wherein the sending a query return instruction to the object platform includes:
receiving a data request from the user platform, and sending the query return instruction to the object platform according to the data request sent by the user platform; or when missing data exists in the database of the service platform, sending the query return instruction to the object platform.

14. The control method of the Industrial Internet of Things of the independent service platform of claim 11, wherein the performing the data processing in the service platform includes:
calculating relevant data of the monitoring values included in a set time period according to preset rules or a data request of the user platform, and sending the relevant data of the monitoring values to the user platform through the information channel; and
displaying the received relevant data of the monitoring values to the user.

15. The control method of the Industrial Internet Things of the independent service platform of claim 11, wherein the method further includes:
storing a control parameter that drives operation of the production line equipment;
storing a control parameter set associated with the control program in the database of the service platform, the control parameter set including a plurality of control parameter groups; wherein
an interaction between the service platform and the management platform includes: calling any of the control parameter groups to drive the production line equipment to operation by the control program; and
the interaction between the user platform and the service platform includes: sending a control parameter calling instruction to the service platform through the user platform and receiving the control parameter calling instruction and sending the control parameter groups in the control parameter calling instruction to the management platform by the service platform.

16. The control method of the Industrial Internet of Things of the independent service platform of claim 15, wherein the interaction between the user platform and the service platform further includes:
through the interaction between the user platform and the service platform, performing at least one operation of control parameter modification, control parameter group deletion, and control parameter group addition on the control parameter groups of the service platform.

17. The control method of the Industrial Internet Things of an independent service platform of claim 11, wherein the method further includes:
uniformly sending the monitoring values from at least one timer to the management platform;
generating an operation schedule of the production line equipment according to process setting and the monitoring values;
according to the operation schedule of the production line equipment, controlling a start-stop sequence and a running speed of the production line equipment in the process node, the process stage, or the process production line, wherein the start-stop sequence is a time node when the production line equipment starts a manufacturing action and a time node when the production line equipment stops the manufacturing action.

18. The control method of the Industrial Internet of Things of the independent service platform of claim 17, wherein the generating an operation schedule of the production line equipment according to process setting and the monitoring values, includes:
obtaining worker characteristics, date characteristics, and time period characteristics of an on-duty worker corresponding to at least one process in the process setting, and average time consumption of the at least one process;
based on the worker characteristics, the date characteristics, the time period characteristics, and the average time consumption, determining a predicted time consumption of the at least one process through a time consumption prediction model; and
based on the predicted time consumption, generating the operation schedule of the production line equipment.

19. The control method of the Industrial Internet of Things of the independent service platform of claim 18, wherein the generating an operation schedule of the production line equipment according to the process setting and the monitoring values, further includes:
when the average time consumption of the at least one process in the process setting exceeds a target time consumption corresponding to at least one process, controlling the timer to remind, wherein reminder content includes a proportion of actual average time consumption of the at least one process exceeding the target time consumption.

20. The control method of the Industrial Internet Things of the independent service platform of claim 17, wherein:
the operation schedule of the production line equipment includes a plurality of index data and all the start-stop sequences of the production line equipment in the process nodes, the process stages, or the process production line, wherein a number of the index data is equal to a number of monitoring value types, and logical pointers in the different index data are configured to point to the start-stop sequences of the production line equipment in the process production line in different process nodes, process stages, or the process production line of the operation schedule of the production line equipment;
the database of the service platform is configured to store a preset operation schedule of the production line equipment, and a storage method of the preset operation schedule of the production line equipment is: for each type of monitoring values, according to a storage method in the database after the monitoring value is distinguished by type, the type of monitoring value and the preset operation schedule of the production line equipment that affects the type of monitoring value are stored in a same database;
the method further includes:
after generating the operation schedule of the production line equipment, by interacting with the service platform, comparing the generated operation schedule of the production line equipment with each preset operation schedule of the production line equipment according to the index data; and
according to comparison result decision logic, determining whether to execute the generated operation schedule of the production line equipment.

* * * * *